Sept. 15, 1970   M. PORTAL ET AL   3,528,166
PROCESS FOR THE WELDING OF METAL OBJECTS
Filed Feb. 19, 1968
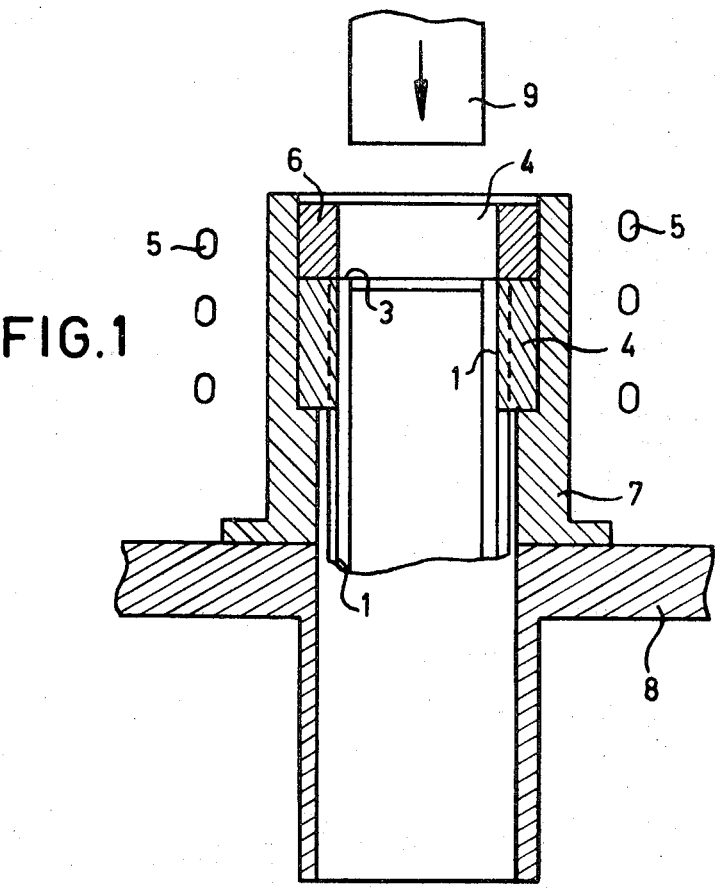
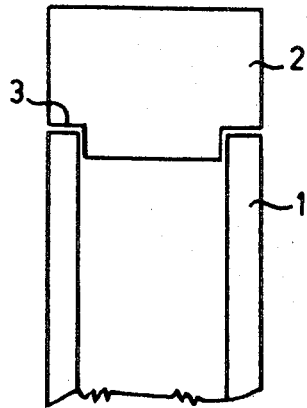
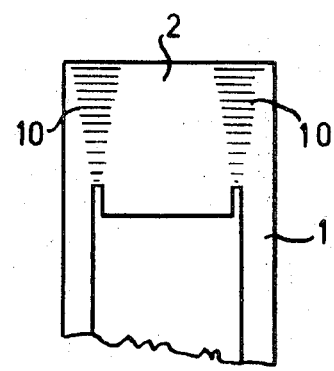
FIG. 2    FIG. 3
INVENTORS
MARCEL PORTAL
GIUSEPPE MUSSO
BY
ATTORNEYS United States Patent Office 3,528,166
Patented Sept. 15, 1970

3,528,166
PROCESS FOR THE WELDING OF
METAL OBJECTS
Marcel Portal, Brebbia, and Giuseppe Musso, Cadrezzate, Italy, assignors to European Atomic Energy Community (EURATOM), Brussels, Belgium
Filed Feb. 19, 1968, Ser. No. 707,023
Claims priority, application Belgium, Apr. 14, 1967, 42,436
Int. Cl. B23k 5/22, 31/02
U.S. Cl. 29—493                 5 Claims

ABSTRACT OF THE DISCLOSURE

Openings in metal bodies are sealed by placing thereover a metal closure element of a greater size than the opening so as to contact the body about the opening, placing this assembly in a die having the size and configuration to closely fit said assembly, heating said assembly to a temperature that the metal becomes plastic and applying pressure to said heated closure element until intermetallic diffusion occurs at the contacting surfaces. The metal in at least one of the body and closure elements is a dispersion hardened alloy such as sintered aluminum powder.

---

The invention relates to a process for the welding of metal objects, at least one of which consisting of a dispersion-hardened alloy like sintered aluminium powder (SAP).

In order to obtain a SAP–SAP leaktight joint, for example of a plug on a tube or can, the mechanical characteristics of which have to be of such a quality as is required by working conditions in a nuclear reactor, it is necessary for the weld to display a mechanical behaviour superior to that of the can.

For effecting a weld between sintered materials, solutions are known such as the argon-arc process and electron-beam processes for welds effected in conditions of complete fusion of the aluminium matrix, and the flash-welding and hot-swaging processes for welds effected by intermetallic diffusion near the melting point of the matrix.

Generally speaking, these known processes have the drawback of involving expensive fabrication, and are difficult to apply to spirally finned cans while at the same time maintaining satisfactory mechanical behaviour.

The process according to the invention improves the known processes and has the following characteristics: For sealing a can by a plug when either the can or the plug or both are of sintered material, the area selected for the plug or its diameter is greater than the inside diameter of the tube; the plug is placed on the tube in a steel die, which assumes the exact shape of the tube; the can-plug assembly is heated until plasticity of the material or materials is obtained, then pressing and eventually vibration are carried out until the plug or the male element is introduced into the other in a period of time sufficient to the destruction of oxide layers on the contacting surfaces and the formation of common metal zones which are not influenced by external corrosive or oxidizing agents and for total interdiffusion of the materials of which the two elements are composed to take place.

A non-restrictive method of execution of the process according to the invention will now be described with reference to the accompanying drawings, wherein:

FIG. 1 represents a longitudinal section through the containment shell, the can, the plug and the piston head, FIG. 2 is a longitudinal section through the can and the plug before welding, FIG. 3 is a longitudinal section through the can and the plug after welding.

A problem, given by way of example, is the sealing of a SAP can 1 (FIG. 1) by a SAP plug 2. Having a diameter slightly higher than the inside diameter of the can 1, the plug 2 is supported through a small neck 3 on the can 1. A weld-sprayed steel die 4 encloses the end of the can 1, assuming its exact form, for example a spirally finned outer surface. The die 4 is used for preheating and holding the can during the welding operation. Preheating of the assembly is effected by high-frequency induction coil 5. The plug 2 is held in the can and in the axis by a stainless steel ring 6, which is also used for preheating. The whole is housed in a container 7, which enables the die to abut onto the frame 8 of a press and ensures that the entire assembly is held in place and the preheating is homogenized. A piston 9 acts in the axis of compression. No surface preparation is necessary for the execution of the weld. The plug 2 is placed on the can 1 and, after heating of the S AP to plasticity, introduced as far as the small shouldering provided in order to avoid any deformation outside the axis of compression. The parts to be welded are heated by high frequency to plasticity of the material. In this state the piston 9 is set in translation in order to introduce the plug 2 at a preset speed so as to permit complete welding.

The press used in this example can be replaced just as advantageously by a vibrating hammer having equal power of action. The head of the hammer or the press piston may be adjusted in accordance with the plug geometry. The operation can effect pure and simple ejection of the already welded plug-can assembly by allowing a pressure slightly higher than the friction resistance between the die 4 and the can 1, the latter being recovered behind the die-holder 8. The diameter of the piston 9 is slightly less than the diameter of the die 4.

FIG. 2 shows the shape and position of the plug 2 and the can 1 before welding, and FIG. 3 after welding, the zone 10 being the welding and plug-can interpenetration zone.

The welding zone is created by the creeping and diffusion of the material or materials within the limits of the minimum creep resistance and the maximum tensile strength of the material or materials.

In the example described to illustrate the invention, the diameter of the plug 2 is 8% higher than the inside diameter of the can 1, this ratio applying in the case of SAP containing 7% by weight of aluminium oxide as a consequence of the study carried out to obtain the optimum creep during the welding operation.

The width of the die 4 is calculated so as to permit sufficient resistance to the total sealing of the plug 2. The force used by the press or the vibrating hammer is greater than the resistance of the can in the die 4.

The following data have been used for the example:

Plugs—diameter 27 mm., height 16 mm.
Can—inside diameter 25 mm., outside diameter 29 mm.
Die—outside diameter 42 mm., height 28 mm.
Piston—diameter 26 mm.
T°—between 500° and 600°
Time—3 to 5 seconds
Piston speed—2.5 m./min.
Max. pressure—about 25 tonnes (can-plug ejection)
Min. pressure—about 2 tonnes (introduction plug)

An additional shouldering on the plug with a diameter equal to or greater than the outside diameter of the can permits limitation of introduction. It is obvious that the process according to the invention can be adjusted to other geometries, dimensions and welding problems. The heat source, for example, could also be an electrical resistance furnace or any other process permitting proper heating of the assembly.

The advantages of the process according to the invention lie mainly in the quality of the weld. Zone creep expels any contamination influencing the surface state and bonds the two parts to be welded together in a turbulent and non-linear shape in the direction of the welding. In addition, the installation of controlled atmosphere or vacuum containments, is avoided. Reproduction is rapid, enabling as it does two operations to be carried out in a relatively short time: welding proper and ejection of the product. There is also the possibility of application for all possible can shapes and dimensions and for hollow or solid plugs.

For the particular case of sealing a SAP can, the following specific advantages are offered:

(1) It is possible to obtain a leaktight weld with a solid plug.

(2) A large welded surface ensures considerable mechanical resistance, greater than the tube resistance.

(3) The plug can, in case of need, be modified after welding in accordance with a predetermined shape.

(4) The welding process is also wholly suitable for a spiral-finned can shape.

The process can be extended to the welding of all metals and cermets, and in particular to large-diameter welds, e.g., such as pressure tubes, planned for use in certain nuclear reactors.

Any metal coatings which it may be planned to use as diffusion barriers withstand the creep welding operation satisfactorily.

Any penetration, e.g., thermocouples, can be easily introduced into either the plug or the can without any deterioration of the parts to be assembled. Needless to say, for effecting vibrations or pressure any suitable device offered by the state of the art may be applied.

We claim:

1. A process for welding a metal closure object to a metal object having an opening therein, the metal of at least one of said objects being a dispersion-hardened alloy, comprising:

(a) shaping the closure object to a size slightly greater than the opening in the other object;

(b) assembling the closure object over the opening in said other object;

(c) placing the assembly in a die having the same shape as the assembly;

(d) heating the die and assembly to a temperature at which at least one of the metals is plastic;

(e) applying pressure to the closure element whereby at least a portion thereof is forced into said opening;

(f) maintaining said heat and pressure until total diffusion of the metals along contacting surfaces of the objects has taken place.

2. A process according to claim 1 wherein the alloy is a sintered aluminum powder.

3. A process according to claim 1 wherein the metal object is a tube and the closure object is a plug having a diameter greater than the inner diameter of said tube.

4. A process according to claim 3 wherein both the tube and the plug are of sintered aluminum powder.

5. A process according to claim 3 wherein the pressure is applied by a vibrating hammer.

References Cited

UNITED STATES PATENTS 3,436,805   4/1969   Friske et al. _____ 29—197 X

FOREIGN PATENTS 1,129,037   5/1962   Germany.

JOHN F. CAMPBELL, Primary Examiner

R. J. SHORE, Assistant Examiner

U.S. Cl. X.R.

29—197, 197.5, 497.5, 498, 504